US011144568B2

(12) United States Patent
Todd

(10) Patent No.: US 11,144,568 B2
(45) Date of Patent: Oct. 12, 2021

(54) SYSTEM AND METHOD FOR MANAGEMENT OF DATA IN DISTRIBUTED SYSTEMS

(71) Applicant: EMC IP Holding Company LLC, Hopkinton, MA (US)

(72) Inventor: Stephen James Todd, North Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 16/393,908

(22) Filed: Apr. 24, 2019

(65) Prior Publication Data

US 2020/0341996 A1 Oct. 29, 2020

(51) Int. Cl.
*G06F 16/25* (2019.01)
*G06F 16/901* (2019.01)
*G06F 16/23* (2019.01)

(52) U.S. Cl.
CPC ........ *G06F 16/258* (2019.01); *G06F 16/2379* (2019.01); *G06F 16/9024* (2019.01)

(58) Field of Classification Search
CPC . G06F 16/258; G06F 16/9024; G06F 16/2379
USPC ........................................................ 707/756
See application file for complete search history.

(56) References Cited

U.S. PATENT DOCUMENTS

| 2001/0029507 | A1* | 10/2001 | Nojima | G06F 16/2365 |
| 2005/0014494 | A1* | 1/2005 | Owen | G06F 16/986 |
| | | | | 455/419 |
| 2007/0270658 | A1* | 11/2007 | Mitchell | G09B 19/00 |
| | | | | 600/300 |
| 2011/0066709 | A1* | 3/2011 | Khurana | H04L 67/2842 |
| | | | | 709/222 |
| 2011/0320968 | A1* | 12/2011 | Vollrath | G06F 9/54 |
| | | | | 715/764 |
| 2015/0227316 | A1* | 8/2015 | Warfield | G06F 3/0661 |
| | | | | 711/103 |

(Continued)

OTHER PUBLICATIONS

"Terbine Opens First Nationwide System of Public Agency IoT Data"; Terbine; Jan. 9, 2019; https://web.archive.org/web/20190109213433/https://terbine.com/.

(Continued)

*Primary Examiner* — James Trujillo
*Assistant Examiner* — Fariborz Khoshnoodi
(74) *Attorney, Agent, or Firm* — Chamberlain, Hrdlicka, White, Williams & Aughtry

(57) ABSTRACT

A global data manager for managing data includes persistent storage and a data manager. The persistent storage stores a data template repository. The data manager obtains an internal request for a data type; identifies internal data of the data type; makes a determination, without being requested by a user that made the internal request, that external data of the data type exists; in response to the determination: polls data stores to obtain the external data of the data type; translates the external data of the data type, using the data template repository, into a format compatible with the internal data of the data type to obtain translated external data of the data type; and displays an external data enhanced interface based on: the internal data of the data type, and the translated external data of the data type.

17 Claims, 14 Drawing Sheets

(56) References Cited

U.S. PATENT DOCUMENTS

| | | | | |
|---|---|---|---|---|
| 2015/0363594 | A1* | 12/2015 | Hunacek | G06F 21/51 |
| | | | | 726/22 |
| 2016/0085801 | A1* | 3/2016 | Hellbusch | G06F 16/2365 |
| | | | | 707/737 |
| 2018/0089269 | A1* | 3/2018 | Pal | G06F 16/24554 |
| 2019/0095491 | A1* | 3/2019 | Bhattacharjee | G06F 16/2433 |

OTHER PUBLICATIONS

Henri Pihkala et al.; "Unstoppable Data for Unstoppable Apps: DATAcoin by Streamr"; Whitepaper, Version 1.0; Jul. 25, 2017.
Vincent Bultot; "DataBroker DAO new year's update by CEO & founder Matthew Van Niekerk"; Databroker—The Marketplace for Data; Jan. 10, 2019; https://databroker.online/blog/76.

\* cited by examiner

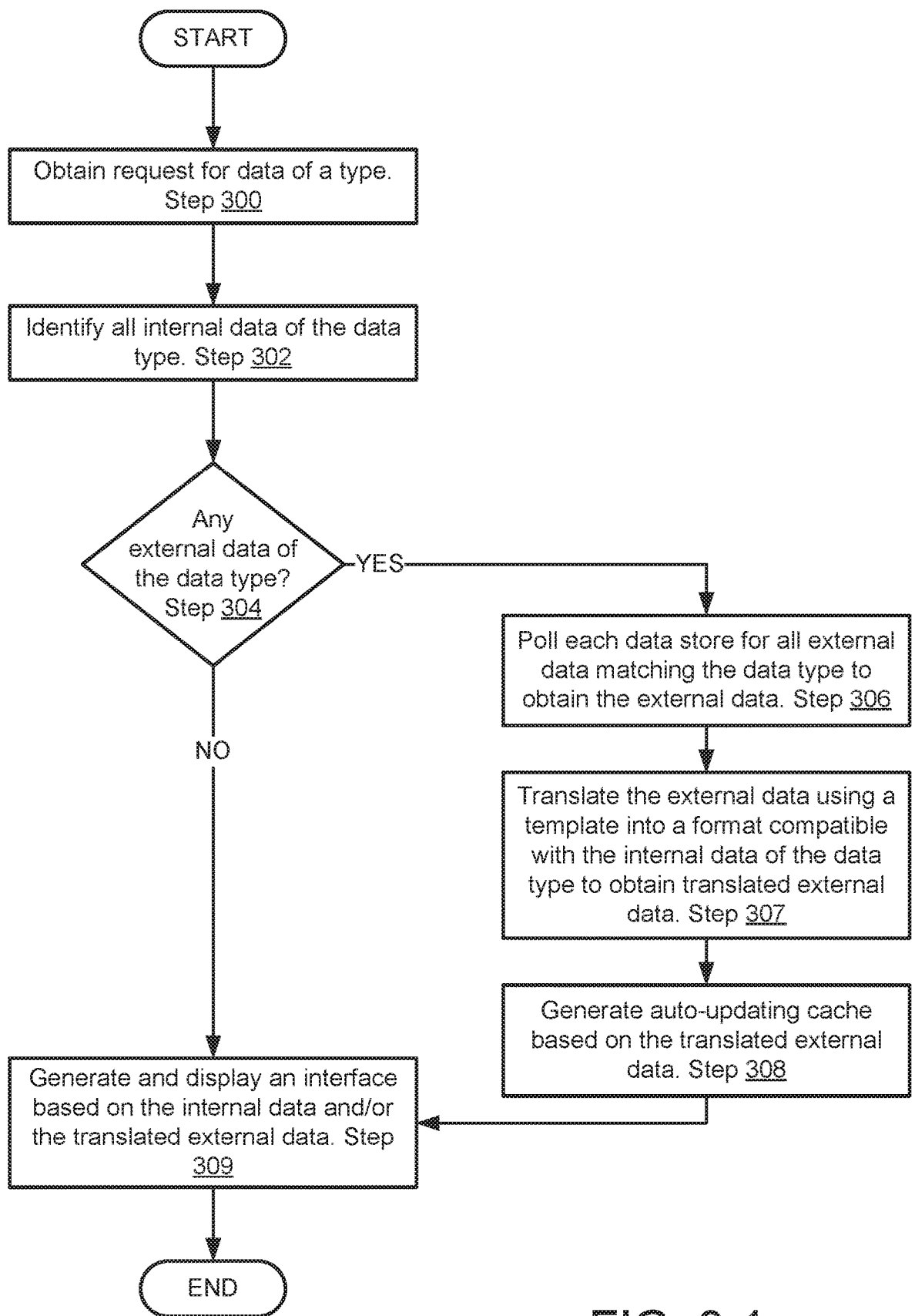
FIG. 3.1

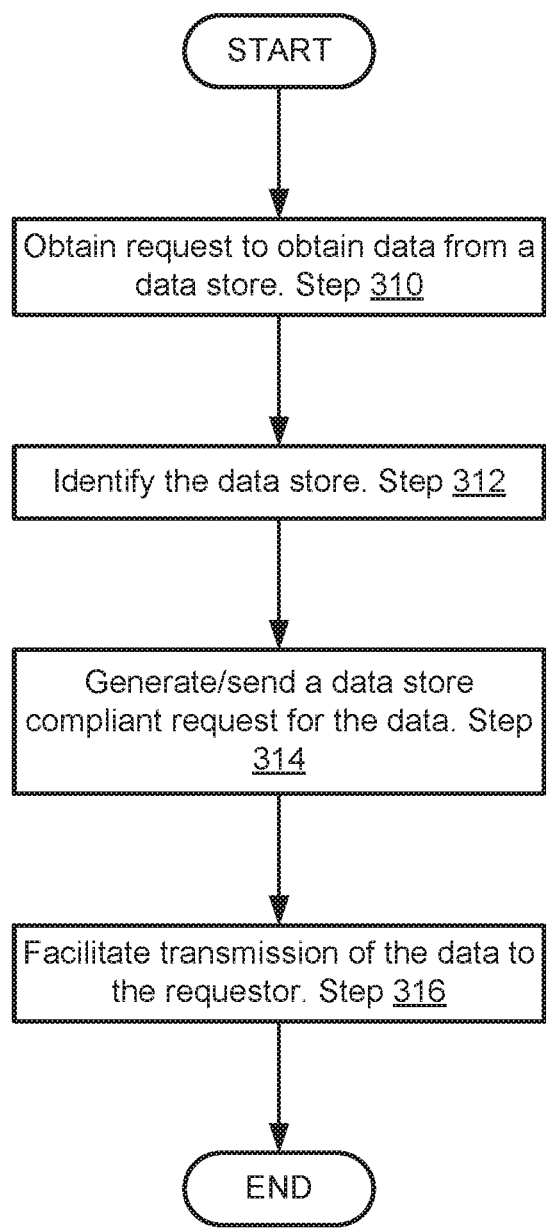
FIG. 3.2

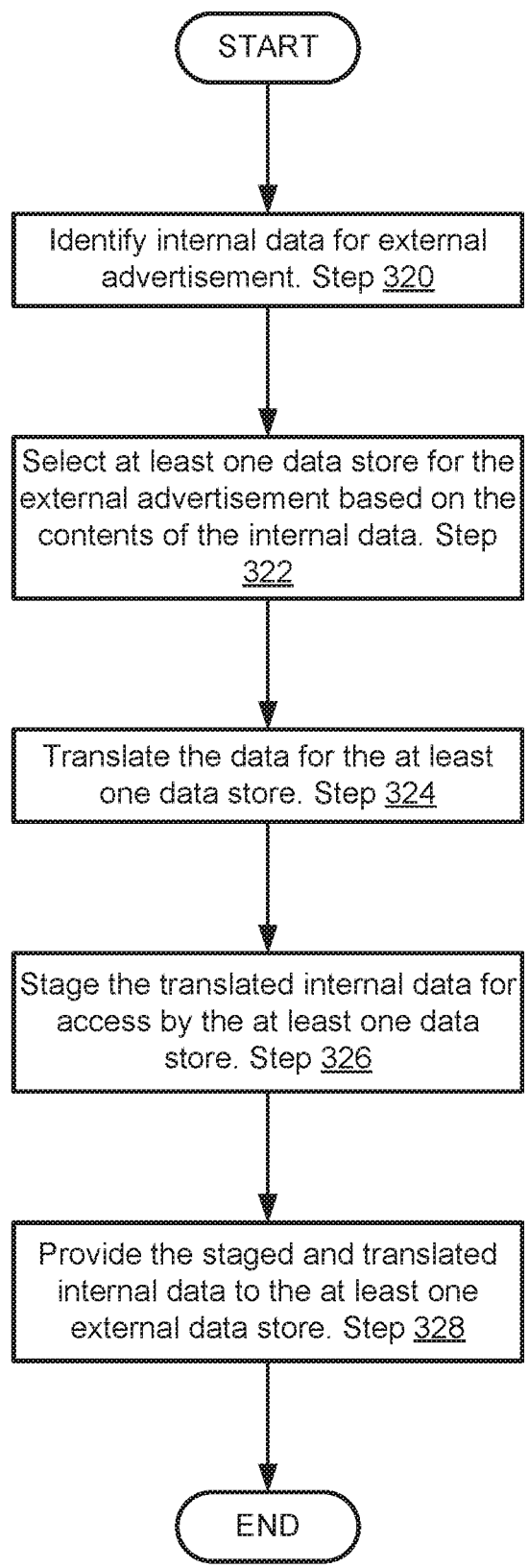
FIG. 3.3

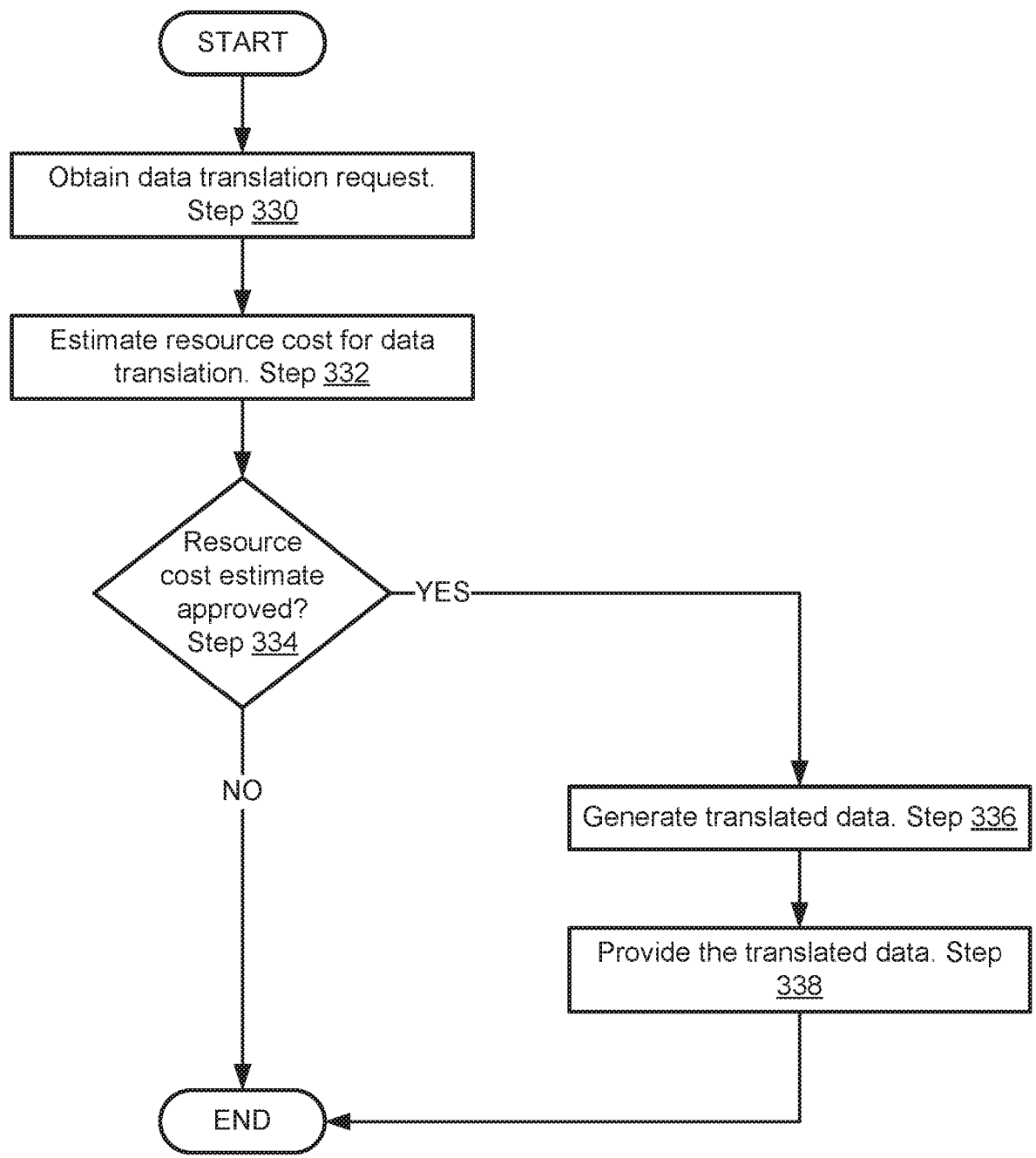
FIG. 3.4

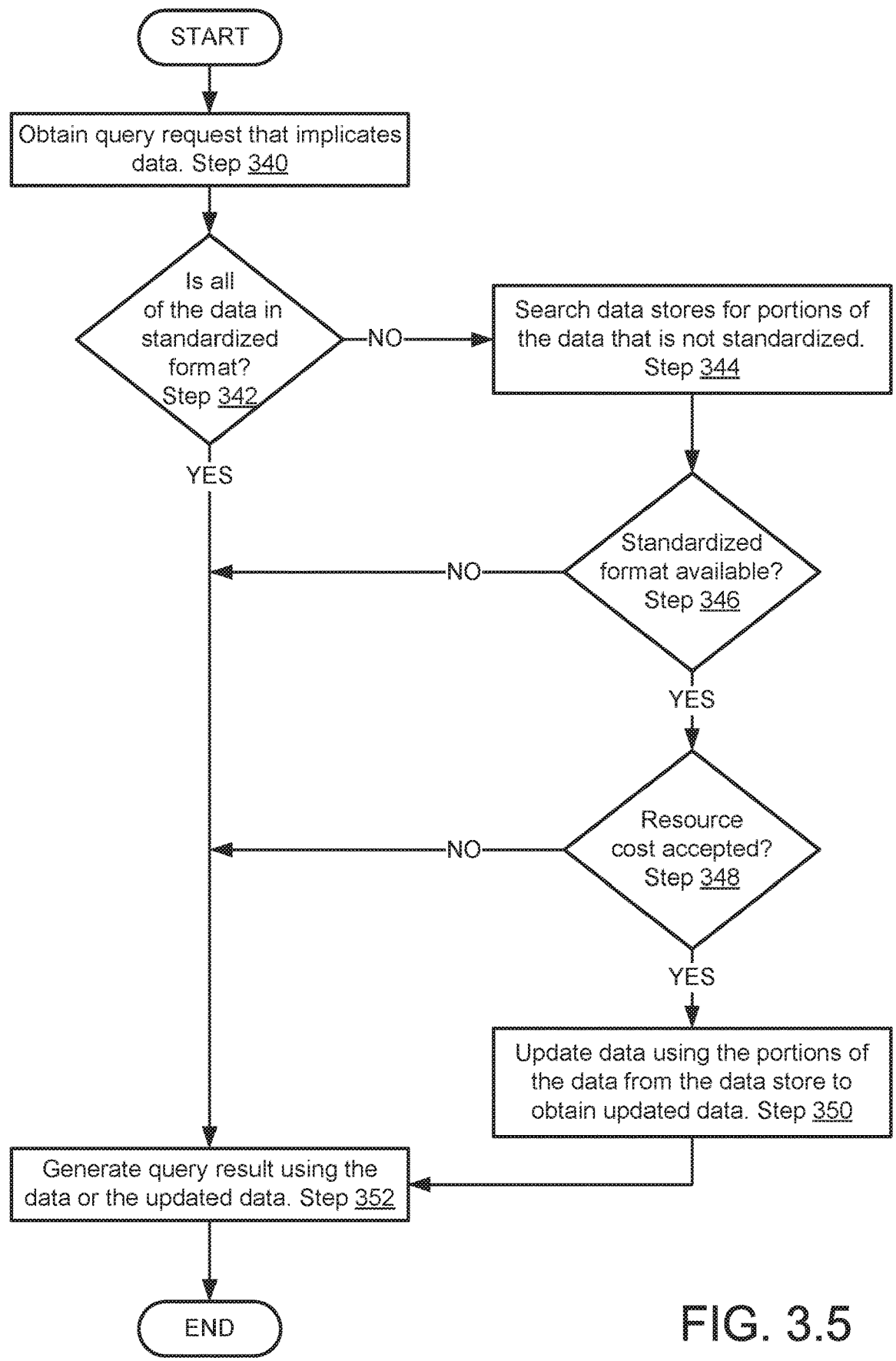
FIG. 3.5

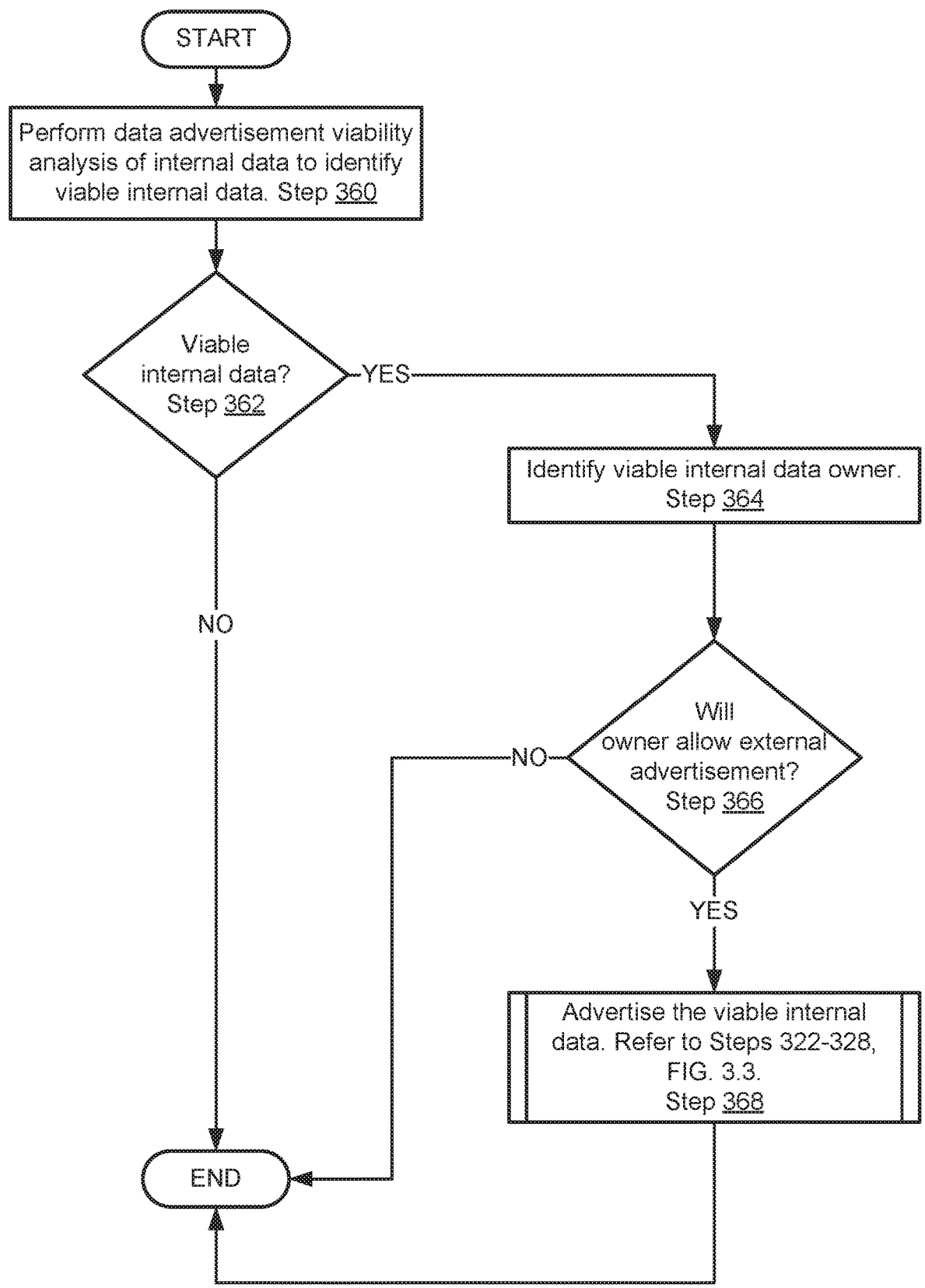
FIG. 3.6

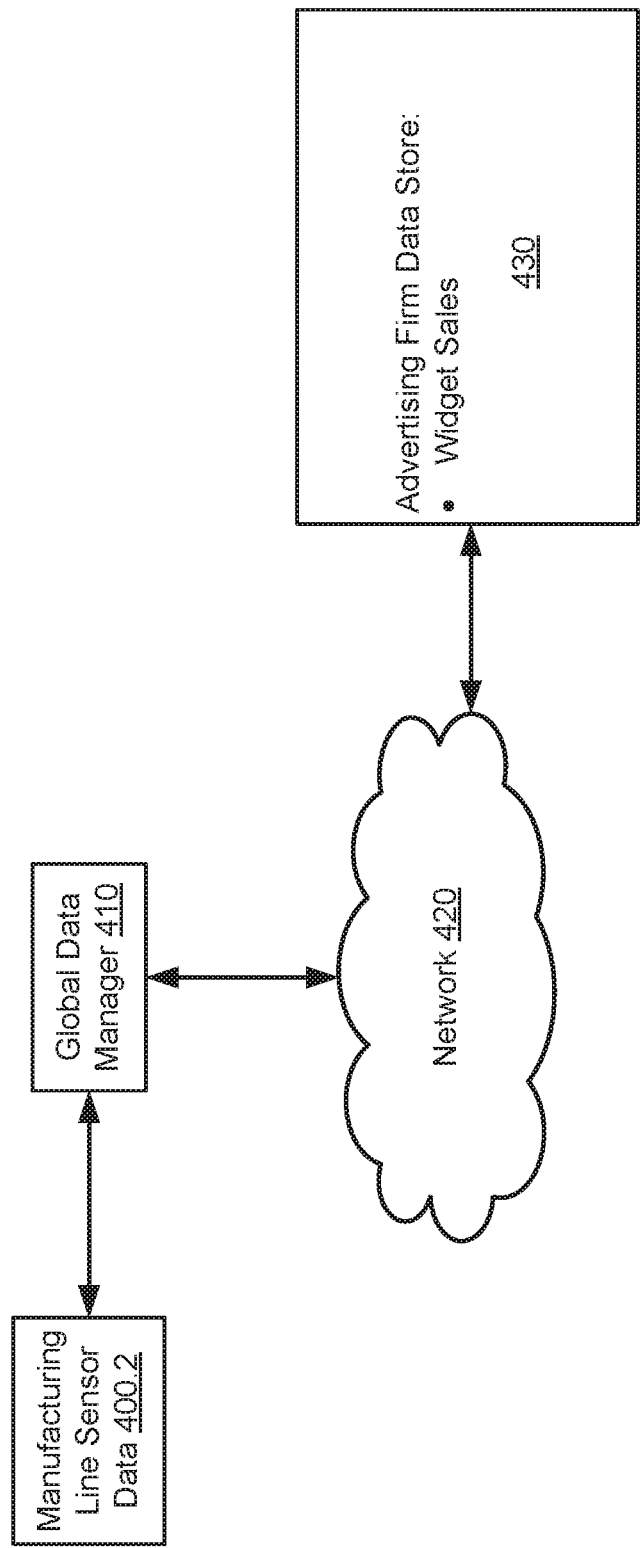
FIG. 4.1

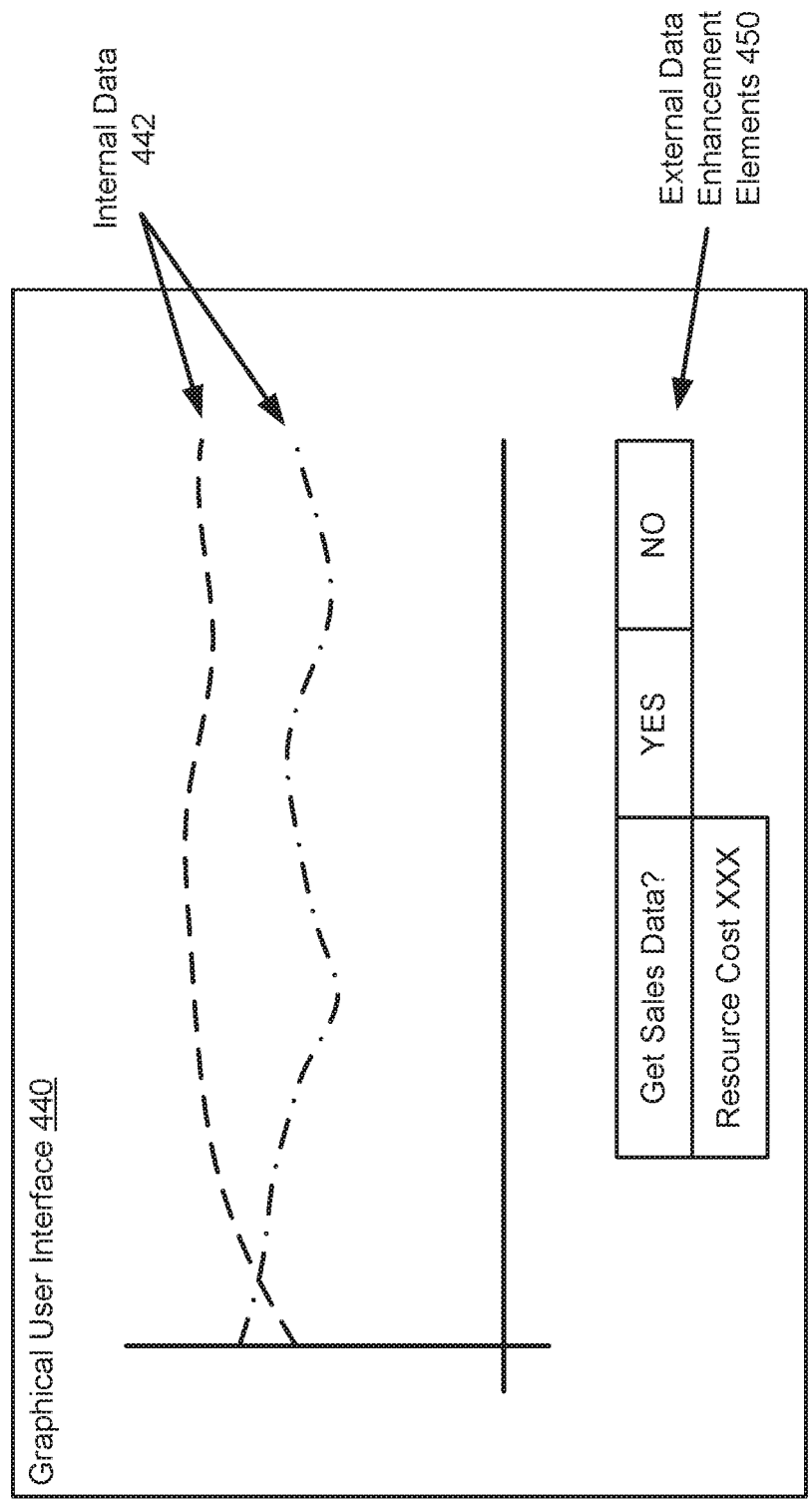
FIG. 4.2

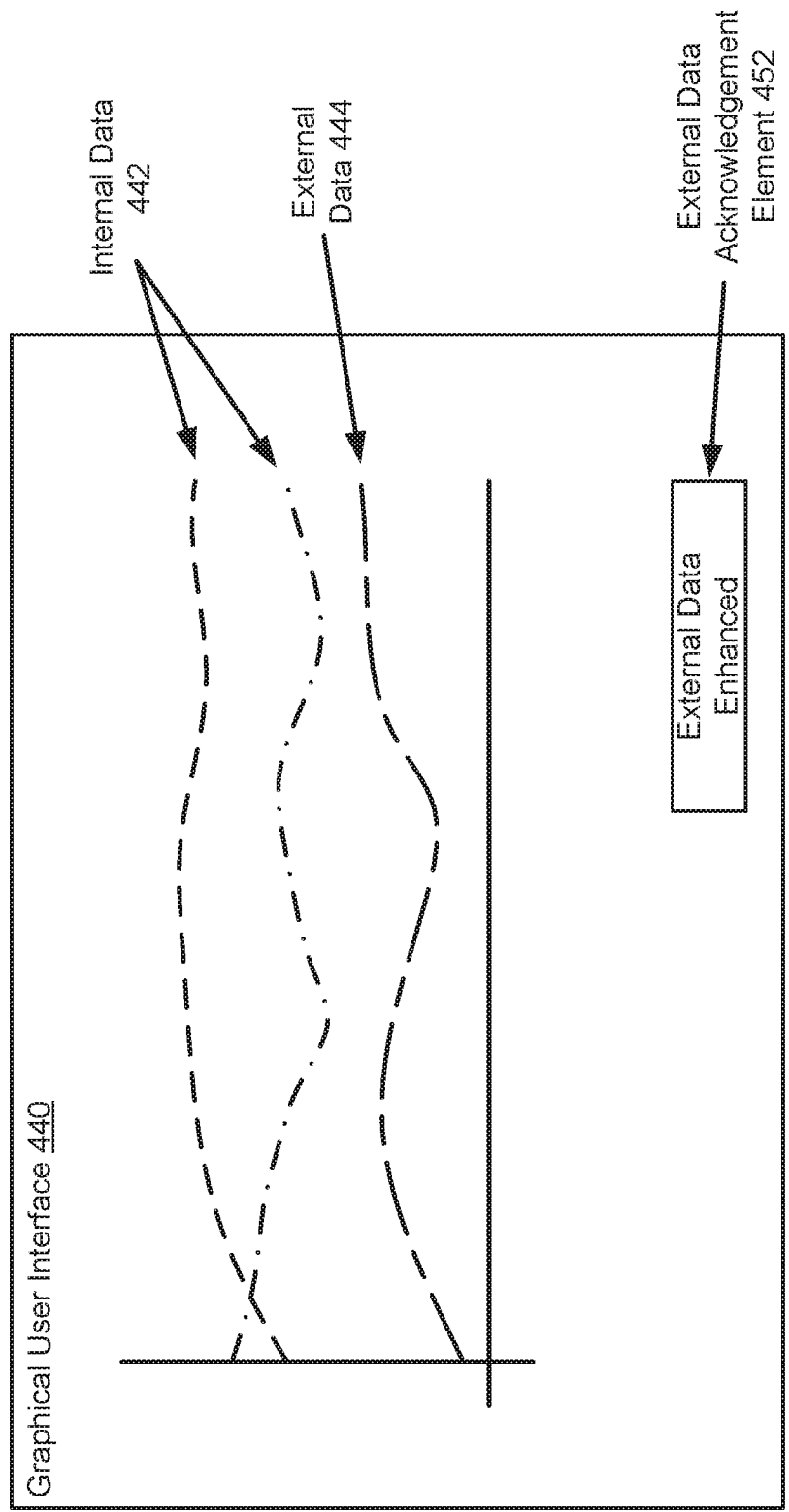
FIG. 4.3

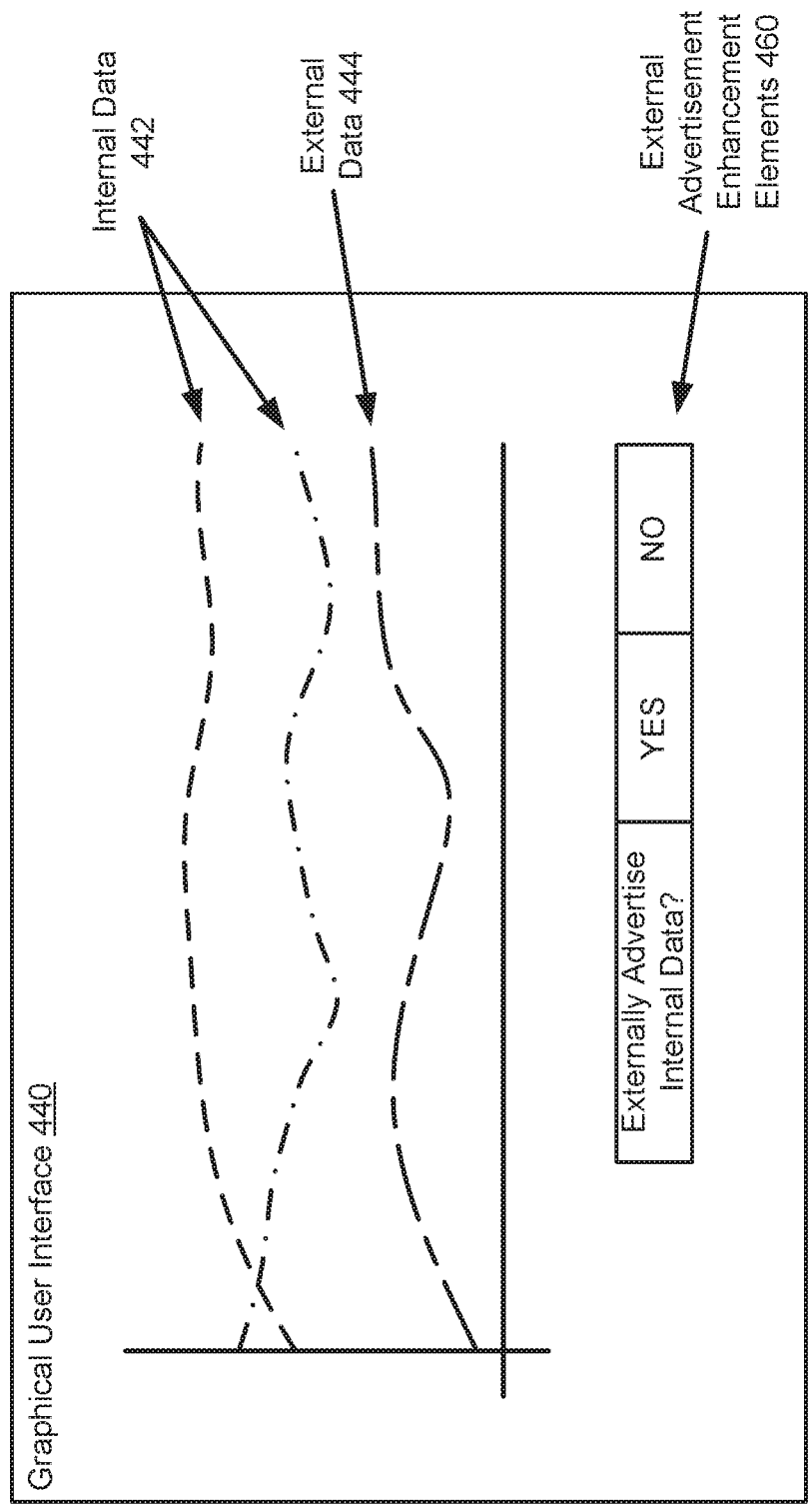
FIG. 4.4

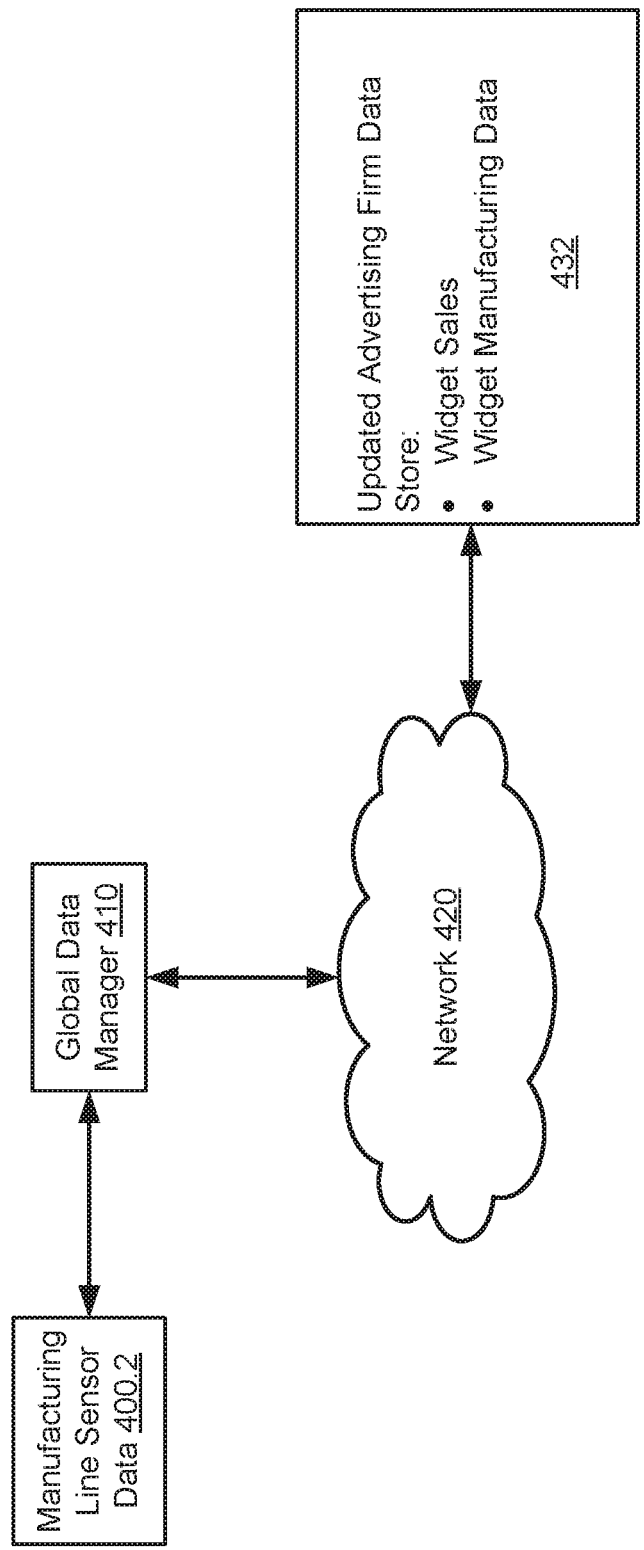
FIG. 4.5

SYSTEM AND METHOD FOR MANAGEMENT OF DATA IN DISTRIBUTED SYSTEMS

BACKGROUND

Data may be generated by a variety of different types of devices and may be stored in a variety of locations. In some cases, data from a variety of sources may be aggregated in a particular location. For example, a business entity may aggregate data obtained from multiple internal sources to form a repository of data upon which decisions will be made that impact the operation of the business entity.

SUMMARY

In one aspect, a global data manager for managing data in accordance with one or more embodiments of the invention includes persistent storage and a data manager. The persistent storage stores a data template repository. The data manager obtains an internal request for a data type; identifies internal data of the data type; makes a determination, without being requested by a user that made the internal request, that external data of the data type exists; in response to the determination: polls data stores to obtain the external data of the data type; translates the external data of the data type, using the data template repository, into a format compatible with the internal data of the data type to obtain translated external data of the data type; and displays an external data enhanced interface based on: the internal data of the data type, and the translated external data of the data type.

In one aspect, a method for managing data in accordance with one or more embodiments of the invention includes obtaining, by a global data manager, an internal request for a data type; identifying internal data of the data type; making a determination, without being requested by a user that made the internal request, that external data of the data type exists; in response to the determination: polling data stores to obtain the external data of the data type, translating the external data of the data type, using a data template repository, into a format that is compatible with the internal data of the data type to obtain translated external data of the data type; and displaying an external data enhanced interface based on: the internal data of the data type, and the translated external data of the data type.

In one aspect, non-transitory computer readable medium in accordance with one or more embodiments of the invention includes computer readable program code, which when executed by a computer processor enables the computer processor to perform a method for managing data. The method includes obtaining, by a global data manager, an internal request for a data type; identifying internal data of the data type; making a determination, without being requested by a user that made the internal request, that external data of the data type exists; in response to the determination: polling data stores to obtain the external data of the data type, translating the external data of the data type, using a data template repository, into a format that is compatible with the internal data of the data type to obtain translated external data of the data type; and displaying an external data enhanced interface based on: the internal data of the data type, and the translated external data of the data type.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method of displaying an interface in accordance with one or more embodiments of the invention.

FIG. 3.2 shows a flowchart of a method of providing a uniform method of accessing data in accordance with one or more embodiments of the invention.

FIG. 3.3 shows a flowchart of a method of advertising data in accordance with one or more embodiments of the invention.

FIG. 3.4 shows a flowchart of a method of providing access to data in a compatible format in accordance with one or more embodiments of the invention.

FIG. 3.5 shows a flowchart of a method of responding to a query request in accordance with one or more embodiments of the invention.

FIG. 3.6 shows a flowchart of a method of selecting viable internal data for advertisement in accordance with one or more embodiments of the invention.

FIG. 4.1 shows a diagram of an example system.

FIG. 4.2 shows a diagram of a graphical user interface generated by the system of FIG. 4.1.

FIG. 4.3 shows a diagram of the graphical user interface generated after being updated using external data.

FIG. 4.4 shows a diagram of the graphical user interface generated after internal data is determined as being viable for external advertisement.

FIG. 4.5 shows a diagram of the example system in a state where the internal data is being externally advertised.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data access in a mixed data source environment. In a mixed data source environment, access to various portions of data may be restricted. To access different portions of the data in a mixed data source environment, different access methods may be required, the different portions of the data may be stored in different formats, and/or different resource costs for accessing the data may be required.

In one or more embodiments of the invention, a global data manager provides a uniform method for accessing data in a mixed data source environment. By providing the uniform method for accessing the data, the complexity of applications that utilize data in the mixed data source environment may be reduced. For example, the applications may utilize the uniform method for accessing the data rather than needing to be capable of accessing the data independently.

In one or more embodiments of the invention, the global data manager charges a transaction fee for providing the uniform method for accessing data in the mixed data source environment. By doing so, the cost of operating the global data manager may be apportioned fairly between users of the global data manager. Such transaction fees may be added transparently as part of each data access.

Figure 1:
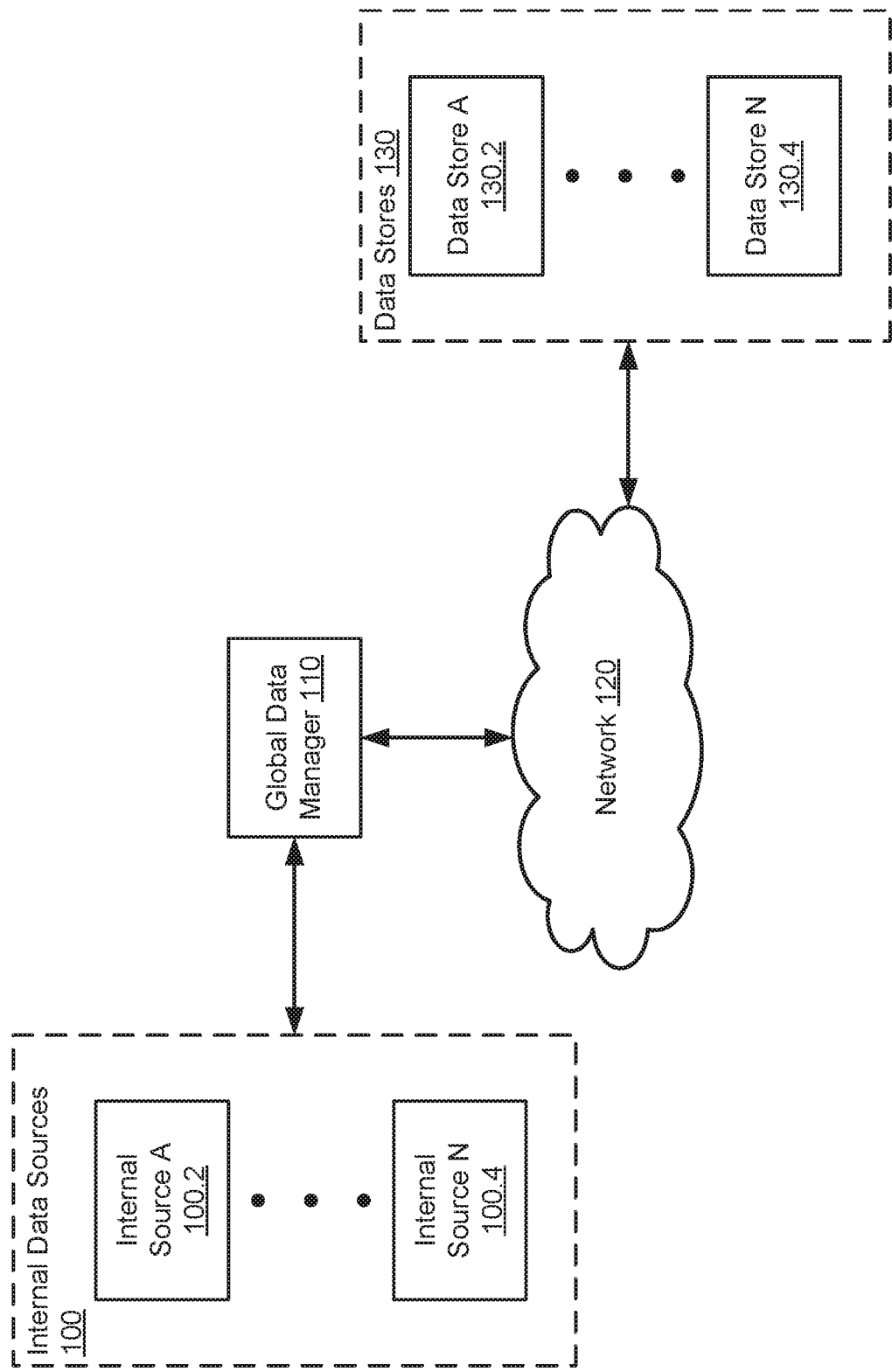
FIG. 1 shows a diagram of a system in accordance with one or more embodiments of the invention.

FIG. 1 shows a diagram of an example system in accordance with one or more embodiments of the invention. The example system may facilitate the management of data within a mixed data source environment. For example, some data within the mixed data source environment may be from internal data sources (100) while other data may be from external sources, e.g., data stores (130). Access to internal data sources (100) may be simple because the data may be in a predetermined format, access to the data may be had using a predetermined method, and there may be no resource cost for accessing the data. In contrast, access to external sources of data may be complicated due to incompatibility between access methods, differences in data format, and the resource cost associated with accessing external data. To facilitate use of such data, the example system may include a global data manager (110). The global data manager (110) may provide a uniform method of accessing all data within the mixed data source environment.

Each of the components of the example system may be interconnected via any number of operable connections. For example, some of the components such as the data stores (130) may be operably connected to the global data manager (110) by a network (120). Each of the components of the example system of FIG. 1 may be interconnected via any combination of wired and/or wireless networks. Each component of the example system of FIG. 1 is discussed below.

In one or more embodiments of the invention, the internal data sources (100) are sources of data associated with an entity. For example, the entity may be a business organization. Each of the internal data sources (100) may supply data to the entity. The internal data sources (100) may be any number and/or type of data source (e.g., internal source A (100.2), internal source N (100.4)) without departing from the invention.

In one or more embodiments of the invention, at least one of the internal data sources (100) is a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the internal data sources (100) is an Internet of things (IOT) device. For example, one of the internal data sources (100) may be a camera operably connected to the Internet and that supplies data via an IOT standard to a database. The data may be a video stream of a particular location. Image recognition may be utilized to extract relevant information from the video stream. The relevant information may be supplied to the database in isolation or in combination with the video stream itself.

In one or more embodiments of the invention, at least one of the internal data sources (100) is a database. The database may include any type of information. For example, the database may include information entered by a data entry process. The information entered into the database via the data entry process may relate to any information that is relevant to an entity.

In a scenario in which one of the internal data sources is a database (or another type of data structure), the database may be hosted by a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions. e.g., computer code, that when executed by the processor(s) of the computing device cause the computing device to perform the functions of the internal data sources (100) described in this application and/or all, or portion, of the methods illustrated in FIGS. 3.1-3.6. The internal data sources (100) may be other types of computing devices without departing from the invention. For additional details regarding a computing device, refer to FIG. 5.

The internal data sources (100) may be hosted by a logical device without departing from the invention. For example, the internal data sources (100) may be hosted by a virtual machine that utilizes computing resources of any number of physical computing devices to provide the functionality of the internal data sources (100). In one or more embodiments of the invention, the internal data sources (100) are implemented as an application hosted by a virtual machine that is hosted by a computing device (see, e.g., FIG. 5) such as a server or a cloud computing architecture. Thus, the internal data sources (100) may be a (or multiple) specially programmed computing device.

In one or more embodiments of the invention, the internal data sources (100) are programmed to provide information to the global data manager (110) and/or other entities. For example, when a request from the global data manager (110) is obtained by one of the internal data sources (100), the internal data sources (100) may take action to address the request.

In one or more embodiments of the invention, the internal data sources (100) maintain an association between the data stored in the internal data sources (100) and an owner of the data. The owner of the data may have the right to manage when and/or under what circumstances the data may be used. For example, the internal data sources (100) may maintain metadata mappings between each portion of data included in the internal data sources (100) and corresponding owners of the portions of the data. The internal data sources (100) maintain metadata regarding other characteristics of the data without departing from the invention. For additional details regarding the operation of the internal data sources (100), refer to FIGS. 3.1-3.6.

Like the internal data sources (100), the data stores (130) may provide data. In one or more embodiments of the invention, the data stores (130) store data that is not owned and/or managed by an entity that owns and/or manages the internal data sources (100). For example, the data stores (130) may be data marketplaces that aggregate data from any number of independent sources (even including data from the entity that owns the internal data sources (100)). The data stores (130) may include data that may be relevant to the entity that owns and/or manages the internal data sources (100). In some embodiments of the invention, an owner and/or manager of data of the internal data sources (100) may store a copy of the data in the data stores (130) which may then be managed by the data stores (130) while the owner and/or manager of the data obtained some rights to control dissemination of the data.

Additionally, the data stores (130) may facilitate advertisement of data from any of the data sources included in the data stores (130). For example, the data stores (130) may offer data included in the data stores (130) for sale to other entities. To do so, the data stores (130) may maintain appropriate web presence such as an online store that offers to sell data to the public or to a limited number of entities (i.e., a private store).

In one or more embodiments of the invention, the data stores (130) sell data. To do so, the data stores (130) may advertise data that is for sale via an online store (or other electronic presence) and may participate in any type of distributed transaction ledger, e.g., blockchain based transaction, to complete sales. A distributed transaction ledger may be a program executed by the data stores (130) and/or other entities that creates a record of and/or enforces agreed upon transactions. The record generated by the distributed transaction ledger may be a data structure that is distributed across any number of entities which creates an immutable record of each transaction processed by the distributed transaction ledger. The data stores (130) may complete sales via other methods than participation in a distributed transaction ledger without departing from the invention.

In one or more embodiments of the invention, at least one of the data stores (e.g., 130.2, 130.4) facilitates transactions using smart contracts. A smart contract may be a program executing via a distributed transaction ledger that facilitates the exchange of a currency (e.g., bitcoins) supported by the distributed transaction ledger and a good such as data included in the data stores. Upon execution of a smart contract, the smart contract may automatically exchange the currency and the data between the parties that entered into the smart contract.

In one or more embodiments of the invention, the data stores (130) may internally store data in different formats, utilize different interfaces for obtaining and/or providing data, and/or may utilize different application programming interfaces (APIs) for interacting with other entities such as, for example, a global data manager (110). In other words, the data stores (130) may be difficult to deal with in the aggregate due to their independent operation.

For example, data store A (130.2) may store data in a comma separated value format while data store N (130.4) may store data in a database format that is unreadable without an interpreter. Due to these differences, the user that wishes to review the data included in each of these data stores may need to use separate interpreters and/or viewers for each data store.

Each of the data stores (130) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of a data stores (130) described in this application and/or all, or portion, of the methods illustrated in FIGS. 3.1-3.6. A data store may be other types of computing devices without departing from the invention. For additional details regarding a computing device, refer to FIG. 5.

The data stores (130) may be implemented as logical devices without departing from the invention. For example, one of the data stores (130) may be a virtual machine that utilizes computing resources of any number of physical computing devices to provide the functionality of the data store. In one or more embodiments of the invention, a data store is implemented as an application hosted by a virtual machine that is hosted by a computing device (see, e.g., FIG. 5) such as a server or a cloud computing architecture. Thus, a data store may be a (or multiple) specially programmed computing device. For additional details regarding the data stores (130), refer to FIGS. 3.1-3.6.

As discussed above, the internal data sources (100) and the data stores (130) may provide access to data. However, the process of accessing the data and/or the storage format of the data may differ depending on the source.

In one or more embodiments of the invention, the global data manager (110) facilitates the use of data included in the internal data sources (100) and the data stores (130). To do so, the global data manager (110) may provide a unified method for accessing, adding to, and/or otherwise interacting with data included in the aforementioned sources of data. By doing so, the global data manager (110) may empower any number of users to easily utilize the data included in the internal data sources (100) and the data stores (130).

The global data manager (110) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the global data manager (110) described in this application and/or all, or portion, of the methods illustrated in FIGS. 3.1-3.6. The global data manager (110) may be other types of computing devices without departing from the invention. For additional details regarding a computing device, refer to FIG. 5.

The global data manager (110) may be a logical device without departing from the invention. For example, the global data manager (110) may be a virtual machine that utilizes computing resources of any number of physical computing devices to provide the functionality of the global data manager (110). In one or more embodiments of the invention, the global data manager (110) is implemented as an application hosted by a virtual machine that is hosted by a computing device (see, e.g., FIG. 5) such as a server or a cloud computing architecture. Thus, the global data manager (110) may be a (or multiple) specially programmed computing device. For additional details regarding the global data manager (110), refer to FIG. 2.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

Figure 2:
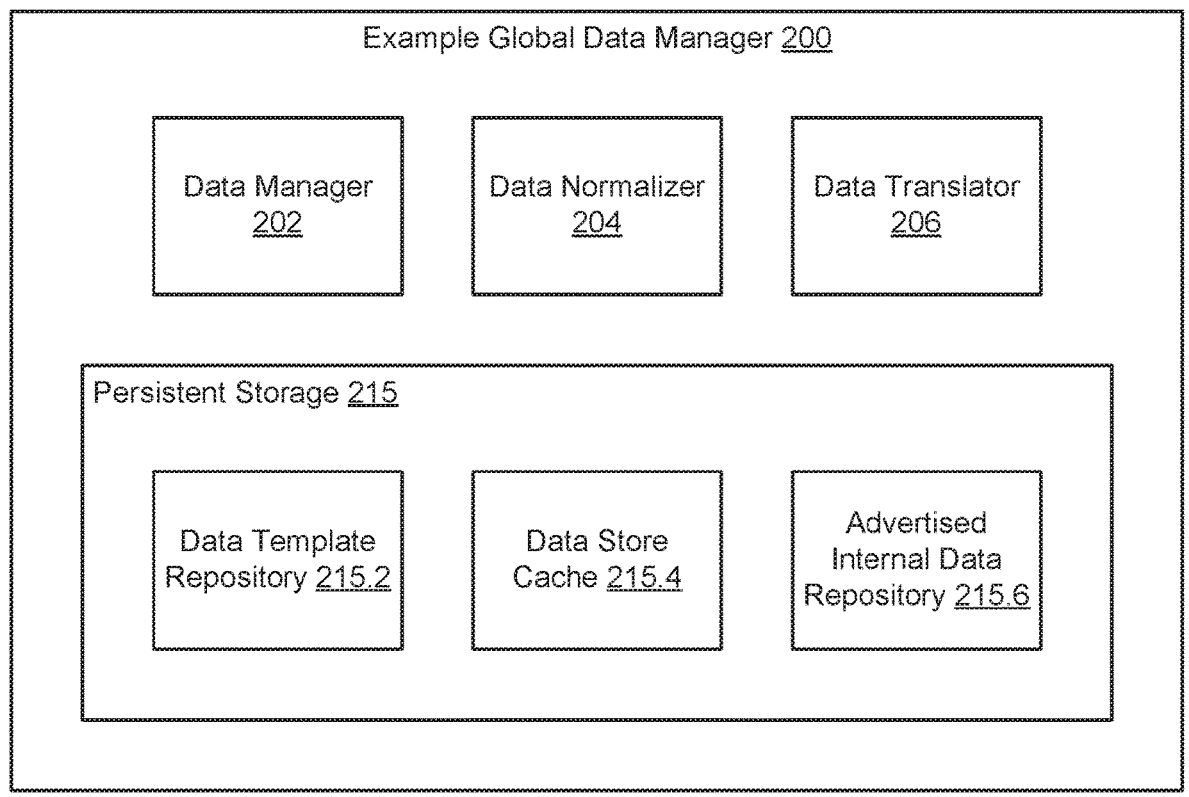
FIG. 2 shows a diagram of an example global data manager in accordance with one or more embodiments of the invention.

As discussed above, a global data manager (110) may facilitate the use of data stored in a variety of locations including internal data sources and data stores. FIG. 2 shows a diagram of an example global data manager (200) in accordance with one or more embodiments of the invention. The example global data manager (200) may be similar to the global data manager (110, FIG. 1) of FIG. 1.

As discussed above, the example global data manager (200) may facilitate use of data stored in a variety of locations. To provide data access, the example global data manager (200) may include a data manager (202), a data normalizer (204), a data translator (206), and/or a persistent storage (215). Each component of the example global data manager (200) is discussed below.

In one or more embodiments of the invention, the data manager (202) is a hardware device including circuitry. The data manager (202) may be, for example, a digital signal processor, a field programmable gate array, or an application specific integrated circuit. The data manager (202) may be other types of hardware devices without departing from the invention.

In one or more embodiments of the invention, the data manager (202) is implemented as computing code stored on a persistent storage that when executed by a processor performs the functionality of the data manager (202). The processor may be a hardware processor including circuitry such as, for example, a central processing unit or a microcontroller. The processor may be other types of hardware devices for processing digital information without departing from the invention.

The data manager (202) may provide data access services. Data access services may include providing access to data to internal users (users of an entity such as a business that includes the example global data manager (200)) and external users. To provide data access to internal users, the data manager (202) may orchestrate obtaining data from internal and/or external sources, harmonizing the format of the obtained data, displaying the harmonized data to users, and/or facilitating the exchange of resources necessary for access to all of the data. For example, in some cases sources of external data may require payment or exchange of computing resource use in exchange for access to the external data (e.g., data in a data store). To provide data access to external users, the data manager (202) may orchestrate preparation of internal data for external sharing, negotiating with external sources (e.g., data stores) for advertising of the data, storing the data in external sources, and/or facilitating receipt of resources for allowing access to the data by the external users (i.e., users that are not part of an entity such as a business that owns or otherwise limits access to internal data by external users).

In one or more embodiments of the invention, the data manager (202) may charge a transaction fee for managing data. For example, whenever the data manager (202) facilitates payment for data and/or receipt of payment for data access, the data manager (202) may reserve a predetermined portion of the payment/receipt as an access charge. Such funds may be reserved while the remainder of the funds may be dispersed to the owner of the data (i.e., the organization for internal data or a data store for accessing of external data). The transaction fee may be specified via any method without departing from the invention.

To provide the aforementioned services, the data manager (202) may invoke the functionality of the data normalizer (204) and/or the data translator (206), discussed below. Additionally, the data manager (202) may perform all, or a part, of the methods illustrated in FIGS. 3.1-3.6.

In one or more embodiments of the invention, the data normalizer (204) is a hardware device including circuitry. The data normalizer (204) may be, for example, a digital signal processor, a field programmable gate array, or an application specific integrated circuit. The data normalizer (204) may be other types of hardware devices without departing from the invention.

In one or more embodiments of the invention, the data normalizer (204) is implemented as computing code stored on a persistent storage that when executed by a processor performs the functionality of the data normalizer (204). The processor may be a hardware processor including circuitry such as, for example, a central processing unit or a microcontroller. The processor may be other types of hardware devices for processing digital information without departing from the invention.

The data normalizer (204) may facilitate the acquisition of data from external sources. For example, the data normalizer (204) may identify a location (such as a data store) where desirable data is stored, identify any requirements for accessing the data, notify a user of requirements, and, upon instruction by the user, take action to meet the requirements for accessing the data so that the user may access the data.

In one or more embodiments of the invention, the data normalizer (204) is implemented as an API. The API may provide a standardized listing of commands for accessing external data that are then translated to appropriate commands compatible with an external storage location of desirable data. By translating the commands on a per-storage location basis, a uniform interface may be provided for all possible external storage locations of desirable data.

In one or more embodiments of the invention, the data normalizer (204) includes smart contract functionality for facilitating acquisition of data from external sources. For example, consider a scenario in which desirable data is stored in a data store that implements a distributed ledger application which provides for the transactions implemented using smart contracts. In such a scenario, the data normalizer (204) may translate the acquisition of desired data into the formation of a smart contract and appending of the smart contract onto the distributed ledger application. By doing so, acquisition of the data may be facilitated.

In one or more embodiments of the invention, the data normalizer (204) may maintain a record of previously performed data acquisitions from external sources. For example, the data normalizer (204) may record data acquisitions using a standardized smart contract appended to an internal distributed ledger application. The data normalizer (204) may, in turn, append a second smart contract in an externally compatible format onto a second distributed ledger application that manages data access in an external location. By doing so, internal users may be provided with a standardized method of obtaining data while abstracting away the complexity of dealing with the data access requirements of external data locations (e.g., data stores).

The data normalizer (204) may facilitate accessing of external data via other methods without departing from the invention. For example, the data normalizer (204) may directly manage the exchange of currency from one form to another for use in accessing external data. By doing so, the data normalizer (204) may enable efficient access to external data while abstracting away data-source dependent data access requirements.

In one or more embodiments of the invention, the data translator (206) is a hardware device including circuitry. The data translator (206) may be, for example, a digital signal processor, a field programmable gate array, or an application specific integrated circuit. The data translator (206) may be other types of hardware devices without departing from the invention.

In one or more embodiments of the invention, the data translator (206) is implemented as computing code stored on a persistent storage that when executed by a processor performs the functionality of the data translator (206). The processor may be a hardware processor including circuitry such as, for example, a central processing unit or a microcontroller. The processor may be other types of hardware devices for processing digital information without departing from the invention.

The data translator (206) may facilitate the translation of data between formats. For example, the data translator (206) may identify a target format for data, identify a source format of the data, and translate the data between the source and target format. To do so, the data translator (206) may utilize data templates included in a data template repository (215.2). As will be discussed in greater detail below, data templates may be used to translate the data between different formats.

In one or more embodiments of the invention, the data translator (206) is implemented as an API. The API may provide a standardized listing of commands for conversion of data between formats. For example, the API may provide commands for conversion between an internal, standardized format and any number of formats utilized by external data sources such as data stores. By providing such functionality, the data translator (206) may eliminate the complexity associated with conversion of data between any number of disparate formats.

The persistent storage (215) may be a storage for storing data. The persistent storage (215) may be a physical or logical storage. For example, the persistent storage (215) may include hard disk drives, solid state drives, and/or tape drives for storing data. The persistent storage (215) may include other types of non-transitory storage mediums without departing from the invention.

In another example, the persistent storage (215) may be logical storage such as a virtual disk. The virtual disk may utilize storage resources of any number of persistent storage mediums such as, for example, hard disk drives, solid state drives, and/or tape drives to provide storage resources.

In one or more embodiments of the invention, the persistent storage (215) stores data utilized by the data manager (202), the data normalizer (204), and/or the data translator (206) when the example global data manager (200) provides data access services. The persistent storage (215) may store data structures including, but not limited to, a data template repository (215.2), a data store cache (215.4), and/or an advertised internal data repository (215.6). Each of these data structures is discussed below.

The data template repository (215.2) may be a data structure that stores information regarding various formats for data. For example, the data template repository (215.2) may include a template that specifies a format for internal data and external data that has been obtained. In other words, a template that specifies a format used internally by an entity. The template may be used to convert all data used by the entity into the same format. By doing so, utilization of the data by any number of applications and/or users of the entity may be greatly simplified. In other words, the applications and/or users of the entity may not need to individually handle conversion of data between formats to utilize such data.

The data template repository (215.2) may also include a template associated with each external data source. Each of these templates may be used to convert data into the format utilized by each external data source. The data manager (202) may facilitate converting data in any format into the format utilized by each external data source using these templates. By doing so, the applications and/or users of the entity may not need to individually handle conversion of data into formats compatible with external sources.

The data store cache (215.4) may be a data structure for storing data obtained from any of the data source. For example, the data store cache (215.4) may cache data from data stores that will be used internally by applications or users of an entity.

The advertised internal data repository (215.6) may be a data structure for storing internal data that will be advertised externally via a data store and/or provided to a data store for distribution to external entities. For example, the advertised internal data repository (215.6) may be used to store sales information that may be desired by other entities. To facilitate storing and transmission of the sales data, the sales data may be stored in the advertised internal data repository (215.6) while the sales data is listed for sale in a data store. By doing so, other copies of the internal data may be deleted or otherwise discarded while a copy in the advertised internal data repository (215.6) is saved for use by external entities.

While the data structures of the persistent storage (215) have been illustrated as separate data structures, the information included in each of these data structures may be combined into a single data structure, divided into any number of data structures, and/or may be stored in locations other than the persistent storage (215) of the example global data manager (200) without departing from the invention. Additionally, each of these data structures may include additional, less, and/or different information than previously discussed above without departing from the invention.

Returning to FIG. 1, the system may facilitate access to data that may be both internal and external. FIGS. 3.1-3.6 illustrate methods that may be performed by components of the system of FIG. 1 to provide such functionality. While the methods illustrated in FIGS. 3.1-3.6 are illustrated as a series of steps, the steps may be performed in a different order, some of the steps may be omitted, and/or any number of the steps may be performed in a parallel and/or partially overlapping manner without departing from the invention.

FIG. 3.1 shows a flowchart of a method in accordance with one or more embodiments of the invention. The method depicted in FIG. 3.1 may be used to display data in accordance with one or more embodiments of the invention. The method shown in FIG. 3.1 may be performed by, for example, a global data manager (e.g., 110, FIG. 1). Other components of the system illustrated in FIG. 1 may perform all, or a portion, of the method of FIG. 3.1 without departing from the invention.

In step 300, a request for data of a type is obtained.

In one or more embodiments of the invention, the request for data of the type is obtained from an internal user. For example, the internal user may be a member of a business organization that includes the global data manager.

The request for the data may specify the type of the data that is being requested. For example, the data type may be sales data for a particular product over a predetermined period of time. In another example, the data type may be production data for a particular product over a predetermined period of time. In a still further example, the data type may be the amount of electricity consumed over a three month period. The data type may be other types of data without departing from the invention.

In one or more embodiments of the invention, the request for the data of the type is obtained from an external user. For example, the external user may be a data store that desires access to a particular data type.

In step 302, all internal data of the data type is identified.

In one or more embodiments of the invention, the internal data of the data type is identified by requesting such information from a data structure that manages data type information. For example, the data structure may be a database. The data type may be requested by sending an appropriately formatted request to the database for all data matching the data type.

In one or more embodiments of the invention, the internal data of the data type is identified by crawling all and/or a portion of the internal data. By crawling the data, metadata specifying the data types of each portion of the internal data to be generated. The metadata may be utilized to identify all data of the data type. The crawling may be performed in real-time or ahead of the identification process performed in step 302. For example, an application may continuously index the internal data.

In one or more embodiments of the invention, a list of all the internal data of the data type may be generated as part of the identification process. For example, the list may specify all portions of data of the internal data matching the data type.

In step 304, it is determined whether any external data of the data type exists.

In one or more embodiments of the invention, the determination is made by sending requests to one or more data stores. The request may specify the particular data type being requested. Each of the data stores may respond and specify whether data of the data type is included in the data store.

In one or more embodiments of the invention, the response from the data stores specifies the resource cost for accessing the data. For example, the response from the data source may specify a cost for accessing the data.

In one or more embodiments of the invention, the determination is made by reading a distributed ledger that specifies data to which access may be provided via one or more data stores. Reading the distributed ledger may enable the global data manager to determine whether any data of the data type may be accessed via any of the data stores.

If it is determined that there is external data of the data type, the method may proceed to step 306. If it is determined that no external data is of the data type, the method may proceed to step 309.

In step 306, each data store is polled for external data matching the data type to obtain the external data.

In one or more embodiments of the invention, each data store is polled by sending a request for any data matching the data type to each data store. In response, each data store may provide the external data matching the data type.

In one or more embodiments of the invention, the external data obtained from a data store is stored in a cache. As noted above, when data is obtained from an external source, it may be in a format that is different from a format used internally. Consequently, the data may be in an unusable format for internal applications/users upon receipt from a data store.

In step 307, the external data is translated into a format that is compatible with the internal data of the data type using the template to obtain translated external data.

In one or more embodiments of the invention, the external data is translated by identifying a format of the external data, obtaining a template that facilitates translation of the external data from the format of the external data to an internal format, and translating of the data to the internal format using the obtained template. The translated external data may be stored in the cache or another internal location.

In one or more embodiments of the invention, the external data is translated via the method illustrated in FIGS. 3.2 and/or 3.4. For example, a data manager (202, FIG. 2) may send a request for translation of the external data to a data translator (206, FIG. 2) which may perform the methods illustrated in FIGS. 3.2 and/or 3.4. The external data may be translated via other methods without departing from the invention.

In step 308, an auto updating cache is generated based on the translated external data.

In one or more embodiments of the invention, the auto updating cache monitors the external data in the data store for changes. If a change to the external data in the data store is detected, the auto updating cache may automatically update the translated data based on the changes. By doing so, the state of translated external data may be continuously updated as the external data is changed over time.

In step 309, an interface is generated and displayed based on internal data and/or translated external data.

In one or more embodiments of the invention, the interface is a graphical user interface. The graphical user interface may include one or more graphical elements that reflect the internal data. The graphical user interface may also include one or more graphical elements that reflect the external data. The number and type of graphical elements may reflect the underlying data being presented and, consequently, there may graphical elements reflecting internal data, external data, or both internal and external data. For an example of a graphical user interface that displays such data, refer to FIGS. 4.1-4.5.

In one or more embodiments of the invention, the graphical user interface may request permission from the user to obtain and display the external data. For example, obtaining the external data may have a cost. Prior to obtaining the external data, the graphical user interface may request permission from the user for providing access to the external data. The global data manager may perform the method illustrated in FIG. 3.2 in response to the user granting permission to access the external data.

The method may end following Step 309.

FIG. 3.2 shows a flowchart of a method in accordance with one or more embodiments of the invention. The method depicted in FIG. 3.2 may be used to display data in accordance with one or more embodiments of the invention. The method shown in FIG. 3.2 may be performed by, for example, a global data manager (e.g., 110, FIG. 1). Other components of the system illustrated in FIG. 1 may perform all, or a portion, of the method of FIG. 3.2 without departing from the invention.

In step 310, a request to obtain data from a data store is obtained.

In one or more embodiments of the invention, the request is obtained from a data manager. For example, the data manager may send the request to obtain data as part of generating an interface for a user.

In one or more embodiments of the invention, the request is obtained from an application. The application may be programmed to obtain external data through a data normalizer and/or the data translator. By doing so, the application may not need to be capable of obtaining data from external sources on its own. Consequently, the complexity of the application may be greatly reduced or relying on other entities for the purposes of obtaining external data.

In step 312, a data store is identified.

In one or more embodiments of the invention, the data store is identified based on the location of the external data. For example, the data stores may be polled to identify the location of various pieces of external data. Such location information may be used to identify the data store.

In step 314, a data store compliant request for the data is generated and/or sent to the data store identified in step 312.

In one or more embodiments of the invention, the data store compliant request is generated by translating the request to obtain data into an appropriate format for the particular data store identified in step 312. Because different data stores may have different requirements for request for data (e.g., format, content of request, etc.), the request obtained in step 310 may need to be modified into a format that is compatible with the data store identified in step 312.

In one or more embodiments of the invention, the data store compliant request is generated based on a standardized request associated with the data store identified in step 312. The global data manager may store a copy of a standardized request for each data store from which it will obtain external data.

In step 316, transmission of the data to the requestor of step 310 is facilitated. Facilitating transmission of the data to the requestor may provide the data to the requestor.

In one or more embodiments of the invention, transmission of the data to the requestor is facilitated by complying with any requirements of the data store (e.g., sending payment for access to the requested data) for accessing the data.

In one or more embodiments of the invention, transmission of the data to the requestor is facilitated by obtaining a copy of the data, storing the data in a cache, sending a copy of the data to the requestor, and/or providing data access instructions to the requestor. In one or more embodiments of the invention, facilitating transmission of the data to the requestor includes translating the data into a format compatible with internal data or another predetermined format. Translation of the data into a format compatible with internal data may be performed via the method illustrated in FIG. 3.4.

The method may end following Step 316.

FIG. 3.3 shows a flowchart of a method in accordance with one or more embodiments of the invention. The method depicted in FIG. 3.3 may be used to advertise data in accordance with one or more embodiments of the invention. The method shown in FIG. 3.3 may be performed by, for example, a global data manager (e.g., 110, FIG. 1). Other components of the system illustrated in FIG. 1 may perform all, or a portion, of the method of FIG. 3.3 without departing from the invention.

In step 320, internal data for external advertisement is identified.

In one or more embodiments of the invention, the internal data is identified based upon its future deletion. For example, data that is scheduled to be deleted in the near future to be identified for external advertisement purposes.

In one or more embodiments of the invention, the internal data is identified based upon a selection by user. For example, when data is displayed to a user via the graphical user interface or other element, a request for designation for external advertisement purposes may be presented to the user. The user may select the data for external advertisement in response to the request. For additional details regarding requests for designation for external advertisement purposes, refer to FIG. 4.2.

In step 322, at least one data store for the external advertisement is selected based on the contents of the internal data.

In one or more embodiments of the invention, the contents of the internal data may be evaluated to determine the type of the internal data. The type of the internal data may be matched to a data store that advertises external data of a similar type. The matched data store may be selected for external advertisement purposes.

In one or more embodiments of the invention, the type of the data may be matched to heuristically determined categories for data. The category may be associated with a corresponding data store and the corresponding data store may be selected for external advertisement purposes.

In step 324, the data for the at least one data store is translated into a format compatible with the data store selected in step 322. As noted above, different data stores may utilize different formats for data. The internal data may be translated into a format that is compatible with the selected data store.

In step 326, the translated internal data is staged for access by the at least one external data store.

In one or more embodiments of the invention, the translated internal data is translated by storing the data in a repository and/or a cache. Once the translated internal data is stored in the repository and/or the cache, the internal data may be deleted.

In step 328, the staged and translated internal data is provided to the at least one external data store. The staged and translated internal data may be provided by sending a copy of the translated internal data to the at least one data store and/or access instructions for the staged and translated internal data may be provided to the at least one data store. The staged and translated internal data may be provided to the at least one external data store via other methods without departing from the invention.

For example, the external data store may enable the data to be purchased. The staged and translated internal data may be provided to the at least one external data store prior to purchase or after purchase by an external entity.

The method may end following step 328.

FIG. 3.4 shows a flowchart of a method in accordance with one or more embodiments of the invention. The method depicted in FIG. 3.4 may be used to translate data in accordance with one or more embodiments of the invention. The method shown in FIG. 3.4 may be performed by, for example, a global data manager (e.g., 110, FIG. 1). Other components of the system illustrated in FIG. 1 may perform all, or a portion, of the method of FIG. 3.4 without departing from the invention.

In step 330, a data translation request is obtained.

In one or more embodiments of the invention, the data translation request specifies external data to which access is desired. The external data may be stored in a data store.

In one or more embodiments of the invention, the data translation request is obtained from an external entity. For example, an external user may send a request for translation. In other words, data translation may be offered as a service to external entities rather than just offering data translation to internal entities.

In step 332, the resource cost for data translation is estimated.

In one or more embodiments of the invention, the resource cost for data translation is estimated by determining the computational cost for translating the data. For example, the number of processor cycles, memory capacity, storage capacity, and/or other computational costs may be determined.

In one or more embodiments of the invention, a currency cost for data translation may be estimated based on an advertised cost for the external data and transaction fee for performing data translation. For example, the cost for the external data may be marked up by the transaction fee for performing the data translation into another format.

In step 334, it is determined whether the resource cost estimate has been approved.

In one or more embodiments of the invention, the resource cost estimate is provided to a requestor of the data translation. The request to approve the resource cost estimate may be sent to the requestor of the data translation. If the requestor of the data translation approves the resource cost estimate, the resource cost estimate is deemed to be approved. Once approved, the resource cost may be processed. For example, a currency transaction may be performed. If the currency transaction fails, the data translation may be aborted.

If it is determined that the resource cost estimate has been approved, the method may proceed to step 336. If it is determined that the resource cost estimate has not been approved, the method may end following step 334.

In step 336, translated data is generated.

In one or more embodiments of the invention, the data is translated by converting the format of the data from that of the source to a format specified in the data translation request. The data may be translated using a template. The template may specify the arrangement of the data after translation. Any number of templates may be used to translate data into any number of formats without departing from the invention. Other methods for translating data, other than via use of a template, may be used to translate the data without departing from the invention.

In step 338, the translated data is provided to a requesting entity.

In one or more embodiments of the invention, the translated data is provided to the requesting entity by sending the translated data to the requesting entity.

In one or more embodiments of the invention, the translated data is provided to the requesting entity by storing the data in a predetermined location and sending access information for the predetermined location to the requesting entity. The predetermined location may be, for example, a cache. The predetermined location may be other locations without departing from the invention.

The method may end following step 338.

FIG. 3.5 shows a flowchart of a method in accordance with one or more embodiments of the invention. The method depicted in FIG. 3.5 may be used to translate data in accordance with one or more embodiments of the invention. The method shown in FIG. 3.5 may be performed by, for example, a global data manager (e.g., 110, FIG. 1). Other components of the system illustrated in FIG. 1 may perform all, or a portion, of the method of FIG. 3.5 without departing from the invention.

In step 340, a query request is obtained that implicates data. The data may be from an internal source which may be accessed by the requesting entity without incurring any access charges.

In one or more embodiments of the invention, a query request is a request that either directly or indirectly requires access to the data for completion of the query request. For example, a query request may request different data (e.g., a sum of the values specified by three pieces of data) that is derived from data (e.g., one of the three pieces of data). Consequently, such a query request implicates the data even though it does not ask for the data directly.

In step 342, is determined whether all of the implicated data is in a standardized format. For example, different portions of internal data may be stored in different formats which may make computations to be performed on the different portions of data problematic.

If all of the data is not in a standardized format, the method may proceed to step 344. If all the data is in the standardized format, the method may proceed to step 352. By proceeding to step 344, other sources of data that are external to the requesting entity may be searched for portions of the data from internal sources that are not in the standardized format.

In step 344, data stores are searched for portions of the data that are not standardized. As noted above, data that is stored in data stores may be in a different format than internal data. Thus, data that is in a data store may be in a format that is compatible with a standardized format. Accordingly, it may be possible to supplement internal data using external data to obtain all of the data in the standardized format.

In step 346, it is determined whether the portions of the data that are found in the data stores are in the standardized format. If the portions of the data in the data stores are in the standardized format, the method may proceed to Step 348. If the data in the data stores is not in the standardized format, the method may proceed to Step 352.

In step 348, it is determined whether the resource cost for accessing the data in the data stores is accepted. The determination may be made by determining resource cost for accessing the data, notifying an entity associated with the query request of the resource cost, and determining whether the entity associated with the query request is willing to pay the resource cost. If the entity associated with the query request is willing to pay the resource cost, the resource cost is deemed to be accepted. If the resource cost is accepted, the method may proceed to Step 350. If the resource cost is not accepted, the method may proceed to Step 352. In other words, if the requesting entity is willing to pay the resource cost for accessing the portions of the data from external sources, the portions of the data from external sources may be obtained to supplement the data from the internal sources to obtain all of the data in the standardized format.

If the resource cost is accepted, a transaction fee and the resource cost may be charged to the entity associated with the query request.

In step 350, the data is updated using the portions of the data from the data store to obtain updated data. In other words, portions of the data that were in a non-standardized format may be replaced with portions of the data from the data store that are in the standardized format. By doing so, the updated data may only include data in the standardized format. Consequently, applications or other entities that may utilize the updated data may do so without requiring each to individually be capable of dealing with different portions of data in different formats.

In step 352, a query result is generated using the data and/or the updated data.

The query result may be any type of result. For example, the query result may be the data and/or updated data. In another example, information derived from the data and/or updated data may be provided as the query result.

The method may end following step 352.

FIG. 3.6 shows a flowchart of a method in accordance with one or more embodiments of the invention. The method depicted in FIG. 3.6 may be used to advertise data in accordance with one or more embodiments of the invention. The method shown in FIG. 3.6 may be performed by, for example, a global data manager (e.g., 110, FIG. 1). Other components of the system illustrated in FIG. 1 may perform all, or a portion, of the method of FIG. 3.6 without departing from the invention.

In step 360, a data advertisement viability analysis is performed on internal data. The viability analysis may be performed to identify internal data that is useful for purposes other than internal use.

In one or more embodiments of the invention, the data advertisement viability analysis determines whether internal data is viable for external advertisement. The viability of the internal data for external advertisement may be determined based on the content of the internal data. For example, data that is anonymized may be considered viable for external advertisement. Any type of viability classification scheme may be used without departing from the invention.

In step 362, it is determined whether the internal data is viable for external advertisement. The determination may be made based on the data advertisement viability analysis. If the internal data is viable for external advertisement, the method may proceed to step 364. If the internal data is not viable for external advertisement, the method may end following step 362.

In step 364, an owner of the viable internal data is identified. The owner of the viable internal data may be identified using metadata that specifies ownership of the viable internal data.

In step 364, it is determined whether the owner of the viable internal data will allow external advertisement of the viable internal data.

The determination may be made by sending an external advertisement authorization request to the owner of the viable internal data. If the owner of the viable internal data approves the request, the owner is deemed willing to allow external advertisement of the viable internal data.

If it is determined that the owner of the viable internal data will allow external advertisement of the viable internal data, the method may proceed to step 368. If it is determined that the owner of the viable internal data will not allow external advertisement of the viable internal data, the method may end following step 366.

In step 368, the viable internal data is advertised. The viable data may be advertised via steps 322-328 of the method illustrated in FIG. 3.3.

The method may end following step 368.

To further clarify aspects of embodiments of the invention, a non-limiting example is illustrated in FIGS. 4.1-4.5. Each of these figures may illustrate a system similar to that illustrated in FIG. 1, information utilized by the system, and/or actions performed by the system. For the sake of brevity, only a limited number of components of FIG. 1 are illustrated in FIGS. 4.1-4.5.

Example

Consider a scenario as illustrated in FIG. 4.1 in which a global data manager (410) is providing data access services for manufacturing line sensor data (400.2) obtained from an internal manufacturing line that produces widgets and data from an advertising firm data store (430). The advertising firm data store (430) may include information regarding widget sales over time. Each of these data sources may be operably connected to the global data manager (410) via a network (420).

At a first point in time, a business analyst may need to determine likely widget sales by the manufacturer of the widgets over the next 12 months. To do so, a modeling application used by the business analyst may send a request to the global data manager (410) for access to the manufacturing line sensor data (400.2) and the widget sales stored in the advertising firm data store (430).

In response to the request, the global data manager (410) may obtain the manufacturing line sensor data (400.2) because it is internal data and access to such data is at no cost to the business analyst. Using the manufacturing line sensor data (400.2), a graphical user interface (440) generated and presented to business analyst as illustrated in FIG. 4.2. The graphical user interface (440) includes a graphical representation of the internal data (442), in this case the manufacturing line sensor data and external data enhancement elements (450) that indicate that relevant external data is available. The external data enhancement elements (450) indicate a resource cost for accessing the external data and present this information to a user.

In this scenario, the business analyst elects to grant permission to obtain the external data by interacting with the external data enhancement elements (450) because necessary data for completion of the work by the business analyst can only be completed by obtaining the external data.

In response to receiving permission from the business analyst to obtain the external data, the global data manager obtains the external data by sending an appropriate request to the advertising firm data store, translates the data into a format that is compatible with the internal data, and updates a graphical user interface (440) to illustrate the external data (444) as illustrated in FIG. 4.3. To inform the business analyst that the external data (444) has been added to the graphical user interface (440), an external data acknowledgment element (452) is added to the graphical user interface (440).

At a second point in time, based on the activity of the business analyst, the global data manager determines that the internal data (442) may be valuable external advertisement. In other words, the global data manager determines that sale of the internal data (442) to external entities may generate revenue.

In response to the determination, the global data manager displays external advertisement enhancement elements (460) in the graphical user interface (440) to alert the business analyst to the viability of advertising the internal data (442) to external users as illustrated in FIG. 4.4.

In the scenario, the business analyst determines that revenue generation may be valuable and that external advertisement of the internal data (442) is warranted. To advertise the internal data (442), the business analyst interacts with the external advertisement enhancement elements (460) to grant permission for external advertisement of the internal data (442).

In response to being granted permission for external advertisement of the internal data (442), the global data manager selects the advertising firm data store for advertisement of the internal data (442), translates the internal data (442) into a format compatible with the advertising firm data store, and facilitates advertisement of widget manufacturing data by updating the advertising firm data store (432) as illustrated in FIG. 4.5.

During each stage of the process illustrated in FIGS. 4.1-4.5, transaction fees and data access fees may be assessed to the business analyst by the global data manager (410) for providing access to data. By doing so, the cost of operating the global data manager (410) may be effectively expensed to the users of the global data manager (410) in proportion to each user's use of the global data manager (410) while simplifying data access in a mixed data source environment.

End of Example

Figure 5:
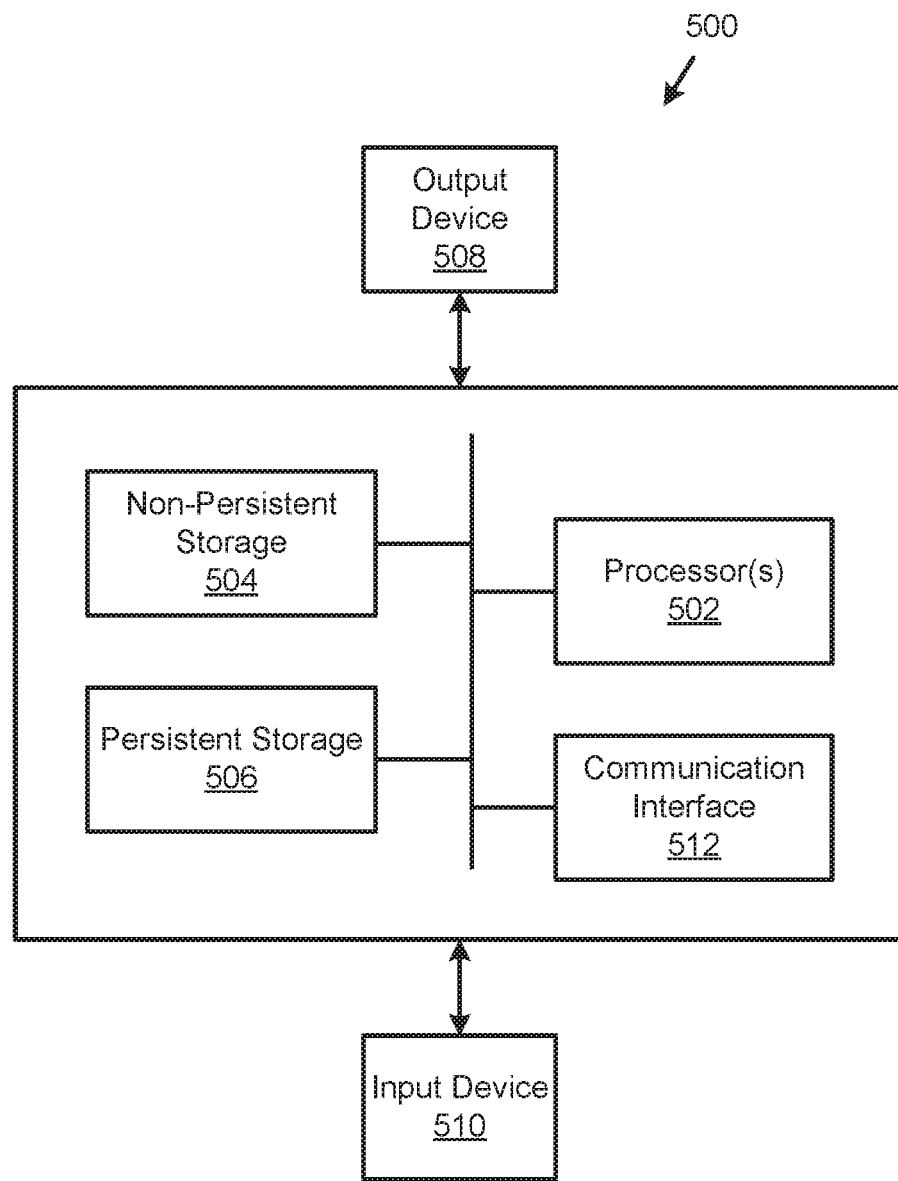
FIG. 5 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide an improved method for accessing data in a mixed data source environment. In a mixed data source environment, access to data may be restricted and require transactions be completed for access to various portions of data to be granted. Further, data in a mixed data source environment may be in various formats that may not be compatible with other formats. Additionally, accessing different portions of data in a mixed data source environment may require different processes. Consequently, accessing data in a mixed data source environment may be problematic. To address these and other issues, embodiments of the invention may provide a method of abstracting data access in a mixed data source environment. By doing so, a unified method for accessing data may be provided to applications and/or users of the mixed data source environment. Providing unified method for accessing the data may dramatically reduce the complexity of data access in the mixed data source environment.

Reducing the complexity of data access may reduce the size of application because each application need not be capable of dealing with the complexities of data access. Further, the computational cost of accessing data may be further reduced by caching data in a standardized format. Consequently, the computation cost of future access to data may be reduced by eliminating the need to repetitively translate data and/or access data across a network environment. By doing so, distributed systems that may present a mixed data source environment may be made more computationally efficient.

In one or more embodiments of the invention, a global data manager may provide such data access while assessing a transaction fee for providing access. By doing so, the cost of such access may be efficiently apportioned across users of the access provided by the global data manager.

Thus, embodiments of the invention may address the problem of limited computing resources in a mixed data source environment by reducing the computational cost of accessing such data. The provided method may be computationally efficient and usable by all applications within the environment thereby reducing the amount of storage space required for the applications.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A global data manager for managing data, comprising:
persistent storage for storing a data template repository; and
a data manager programmed to:
obtain an internal request for a data type;
identify internal data of the data type;
make a determination, without being requested by a user that made the internal request, that external data of the data type exists;
in response to the determination:
poll data stores to obtain the external data of the data type;
translate the external data of the data type, using the data template repository, into a format compatible with the internal data of the data type to obtain translated external data of the data type; and
display an external data enhanced interface based on:
the internal data of the data type, and
the translated external data of the data type,
wherein displaying the external data enhanced interface comprises:
generating a first graphical element based on the internal data of the data type using a graphical element generation method that is incompatible with the external data of the data type.

2. The global data manager of claim 1, wherein the global data manager is further programmed to:
   generate an auto-updating cache based on the translated external data of the data type.

3. The global data manager of claim 1, wherein the external data is stored in a data store of the data stores separate from the global data manager.

4. The global data manager of claim 3, wherein the external data is stored in a format that is incompatible with the internal data.

5. The global data manager of claim 1, wherein displaying the external data enhanced interface further comprises:
   prior to generating a second graphical element based on the translated external data:
      displaying a resource cost associated with the external data; and
      obtaining authorization to expend the resource cost from a user.

6. The global data manager of claim 5, wherein displaying the external data enhanced interface further comprises:
   generating an external advertisement enhancement element to obtain input from the user regarding the internal data;
   making a second determination, based on the obtained input from the user, that external advertisement of the internal data is authorized; and
   in response to the second determination:
      translating the internal data of the data type using the data template repository into a second format compatible with the external data of the data type to obtain translated internal data of the data type; and
      orchestrating external advertisement of the translated internal data using a data store of the data stores that is separate from the global data manager.

7. A method for managing data, comprising:
   obtaining, by a global data manager, an internal request for a data type;
   identifying internal data of the data type;
   making a determination, without being requested by a user that made the internal request, that external data of the data type exists;
   in response to the determination:
      polling data stores to obtain the external data of the data type,
      translating the external data of the data type, using a data template repository, into a format that is compatible with the internal data of the data type to obtain translated external data of the data type; and
      displaying an external data enhanced interface based on:
         the internal data of the data type, and
         the translated external data of the data type,
      wherein displaying the external data enhanced interface comprises:
         generating a first graphical element based on the internal data of the data type using a graphical element generation method that is incompatible with the external data of the data type.

8. The method of claim 7, further comprising:
   generating an auto-updating cache based on the translated external data of the data type.

9. The method of claim 7, wherein the external data is stored in a data store of the data stores separate from the global data manager.

10. The method of claim 9, wherein the external data is stored in a format that is incompatible with the internal data.

11. The method of claim 7, wherein displaying the external data enhanced interface further comprises:
    prior to generating a second graphical element based on the translated external data:
       displaying a resource cost associated with the external data; and
       obtaining authorization to expend the resource cost from a user.

12. The method of claim 11, wherein displaying the external data enhanced interface further comprises:
    generating an external advertisement enhancement element to obtain input from the user regarding the internal data;
    making a second determination, based on the obtained input from the user, that external advertisement of the internal data is authorized; and
    in response to the second determination:
       translating the internal data of the data type using the data template repository into a second format compatible with the external data of the data type to obtain translated internal data of the data type; and
       orchestrating external advertisement of the translated internal data using a data store of the data stores that is separate from the global data manager.

13. A non-transitory computer readable medium comprising computer readable program code, which when executed by a computer processor enables the computer processor to perform a method for managing data, the method comprising:
    obtaining, by a global data manager, an internal request for a data type;
    identifying internal data of the data type;
    making a determination, without being requested by a user that made the internal request, that external data of the data type exists;
    in response to the determination:
       polling data stores to obtain the external data of the data type,
       translating the external data of the data type, using a data template repository, into a format that is compatible with the internal data of the data type to obtain translated external data of the data type; and
       displaying an external data enhanced interface based on:
          the internal data of the data type, and
          the translated external data of the data type,
       wherein displaying the external data enhanced interface comprises:
          generating a first graphical element based on the internal data of the data type using a graphical element generation method that is incompatible with the external data of the data type.

14. The non-transitory computer readable medium of claim 13, method further comprises:
    generating an auto-updating cache based on the translated external data.

15. The non-transitory computer readable medium of claim 13, wherein the external data is stored in a data store of the data stores separate from the global data manager.

16. The non-transitory computer readable medium of claim 15, wherein the external data is stored in a format that is incompatible with the internal data.

17. The non-transitory computer readable medium of claim 13, wherein displaying the external data enhanced interface further comprises:

prior to generating a second graphical element based on the translated external data:
   displaying a resource cost associated with the external data; and
obtaining authorization to expend the resource cost from a user.

* * * * *